Sept. 11, 1928.
H. A. LEWIS
DIFFERENTIAL RELEASE TRANSMISSION
Filed July 16, 1927
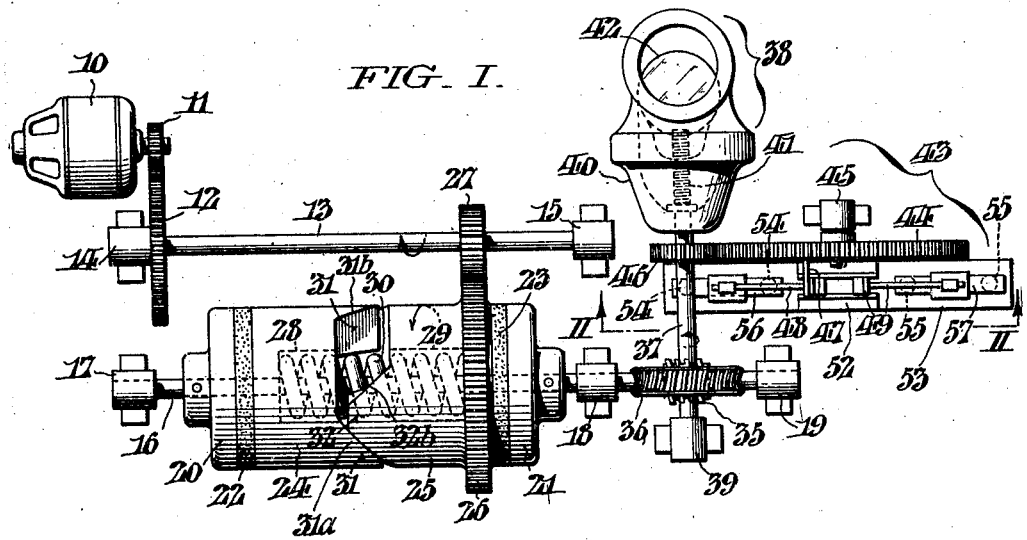
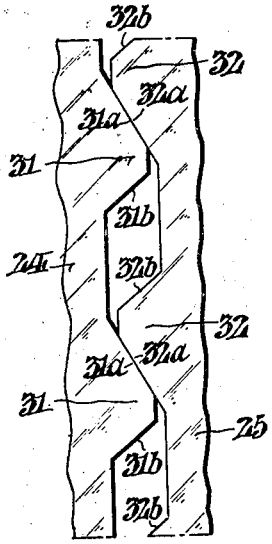
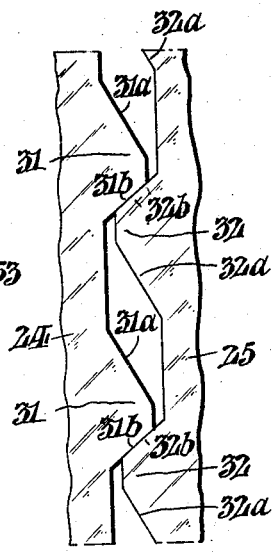
WITNESSES
John C. Bergner.
Thomas W. Kerr Jr.
INVENTOR:
Harry A. Lewis,
BY Fraley Paul
ATTORNEYS.

Patented Sept. 11, 1928.

1,684,233

UNITED STATES PATENT OFFICE.

HARRY A. LEWIS, OF NORRISTOWN, PENNSYLVANIA.

DIFFERENTIAL RELEASE TRANSMISSION.

Application filed July 16, 1927. Serial No. 206,204.

This invention relates to transmissions useful in communicating motion from a source of power to an object or device which is to be moved or driven.

In connection with such transmissions, I aim to enable delivery of different working effort or torque from the prime mover under different conditions of operation; or, in other words, in accordance with the requirements imposed by the object or device which is being moved or actuated; and to secure this desideratum with the prime mover at all times safeguarded against being overloaded.

A differential release transmission having the above attributes is particularly useful in operating large valves and the like where there is a tendency of the closures to stick at times in the shut-off position so that greater effort is required in opening the valves than in closing them.

A further aim of my invention is to provide, in an embodiment especially suited to uses such as above noted, for automatic stoppage of the prime mover immediately after the desired work has been accomplished at each operation.

Still further objects of my invention will be manifest from the detailed disclosure which follows.

With reference to the drawings, Fig. I is a plan view, more or less diagrammatically represented, of a valve operating mechanism conveniently incorporating my improved differential release transmission.

Fig. II is a sectional view, taken as indicated by the arrows II—II in Fig. I.

Figs. III and IV are diagrammatic views showing linear surface developments of clutch members, forming part of the transmission, for governing the delivery of variant torque.

With reference first to Fig. I of these illustrations, 10 designates a prime mover, which, in the present instance, is conventionally represented as an electric motor adapted to drive, through reduction gearing including a spur pinion 11 and an intermeshing gear 12, a counter-shaft 13. This counter-shaft 13 is journaled by suitably supported bearings 14, 15, in parallel relation to a transmission shaft 16 that rotates in bearings 17, 18 and 19. As shown, the transmission shaft 16 carries a pair of pinned abutments in the form of disk collars 20, 21 which are faced with suitable friction material as at 22, 23, such, for example, as fibre asbestos. The interval between the abutments 20, 21 is occupied by a pair of opposing clutch members 24, 25 whereof the latter is integrally formed with a gear 26 for meshing engagement with a driving pinion 27 on the counter-shaft 13 previously mentioned. These clutch members 24, 25 are cylindric in form, loosely mounted on the shaft 16 and counterbored as at 28, 29 to receive a compression spring 30 whereby their outer faces are yieldingly maintained in contact with the friction material 22, 23 on the abutments 20, 21. The clutch members 24, 25 have integrally formed teeth 31, 32, in this instance two in number. These teeth 31, 32 interlap as shown in Figs. I, III and IV, and are spaced on the clutch members 24, 25 so as to provide a circumferential clearance permitting substantially a quarter revolution of lost motion between them. As seen to the best advantage in Figs. III and IV, the opposite side edges $31^a$, $31^b$ of the teeth 31 of the clutch member 24 are pitched at different angles to cooperate with correspondingly sloped edges $32^a$, $32^b$ on the teeth of the companion clutch member 25 as later on explained.

Affixed to the transmission shaft 16 between the bearings 18, 19, is a worm 35 to drive an intermeshing worm-wheel 36 on the actuating stem 37 of a gate valve, comprehensively indicated 38 in Fig. I. The stem 37 has journal support in a bearing 39 as well as in the bonnet 40 of the valve 38, its inner end being screw threaded as at 41 to engage the closure member or gate 42.

For the purpose of stopping the motor 10 after the valve 38 has been opened or closed, I employ the limit switch comprehensively designated 43 in Figs. I and II. This limit switch 43 includes a rotating disk in the form of a gear 44 which is rotatably supported by a standard 45. The gear 44 is driven by an intermeshing pinion 46 on the valve stem 37, and, at a point near its periphery, carries a laterally projecting pin 47, which, as the gear 44 is rotated in one direction or the other, alternately engages the vertical arms of bell-crank actuating levers 48, 49, respectively pivoted at 50, 51 to an angle bracket 52 supported on the switch base 53. Let into opposite ends of the switch base 53 are conductor terminals 54, 54 and 55, 55 with heads adapted to be bridged respectively by contact members 56, 57 with pivotal attachment on the horizontal extremities of the bell-crank levers 48, 49. A spring 58 in compression between the upright arms of the bell-crank levers 48, 49 serves to maintain the members 56, 57 in contact with the heads of the terminal studs 54, 55 during rotation of the gear 44. The wiring connections from the limit switch to the motor 10 may be such as ordinarily employed in installations of this character and well understood in the art, and are therefore omitted from the drawings, complicacy and confusion being thereby avoided.

The operation of my invention is as follows: Let it be assumed that the motor 10 is causing rotation of the counter shaft 13 in the direction indicated by the arrow thereon; and that such motion is transmitted in the opposite direction to the clutch member 25 through the gears 27, 26, with the edges 31ª, 32ª of the teeth 31, 32 of the members 24, 25 cooperating as shown in Fig. III to cause imposition of frictional pressure against the abutments 20, 21. As a consequence of the motion thereby imparted to the transmission shaft 16, the gear 36 is revolved by the worm 35, and the valve stem 37 accordingly rotated in the direction of the arrow thereon to move the gate 42 of the valve 38 to open position. Just as the open position of the valve 38 is reached, the pin 47 on the gear disk 44 encounters the lever 49 to effect lifting of the contact member 57 and automatic stoppage of the motor 10 before jamming can take place between the gate 42 and the valve bonnet 40. Should the limit switch 43 for any reason fail during this operation and result in jamming of the valve gate 42, slippage will take place between the clutch members 24, 25 and the abutments 20, 21 on the shaft 16 thereby protecting the motor 10 against injury. When the valve 38 is to be closed, the motor 10 is reversed in its rotation through control of a suitable switch (not shown) provided for that purpose, the movement being communicated through the same interposed parts to the clutch member 25 as before, but this time in the opposite direction. Now, by virtue of the circumferential clearance between the teeth 31 of the clutch member 24 and the teeth 32 of the member 25, a considerable amount of lost motion is allowed to take place so that the motor 10 is given an opportunity to pick up speed before the inclined cam edges 31b, 32b, of the teeth 31, 32 actually contact after the manner shown in Fig. IV. Thus when contact does take place subsequently between the teeth 31, 32, movement is suddenly imparted to the shaft 16 to the end that its inertia, as well as opposition due to sticking of the valve closure 42, is effectively overcome, opening of the valve 38 following thereupon with comparative ease. At the conclusion of the operation, engagement of the stud 47 on the gear 44 takes place with the lever 48 of the limit switch 43 whereby the contact member 56 is elevated to automatically stop the motor 10 as in the previous instance. It will be especially noted from Figs. III and IV by virtue of the difference in the angular pitch between the surfaces 31a, 32a and the surfaces 31b, 32b, that a wedging action takes place to a greater degree with the first pair cooperating than when the latter two coact. Accordingly, correspondingly greater frictional pressure is exerted upon the abutments 20, 21 when the valve 38 is opened than at the time when said valve is closed. In practice the pitch of these angles is determined in accordance with the power which must be developed to do the required work, and may therefore vary greatly, consideration being of course given to prevent overloading of the motor 10 should an obstacle or solid interfere with the closing of the valve 38, or the limit switch 43 fail to operate.

While I have shown and described my invention as adapted to valve operation, it is to be expressly understood that the same is applicable to various other uses with advantages equal to those hereinbefore pointed out.

Having thus described my invention, I claim:

1. A differential release transmission comprising a transmission shaft with spaced abutments thereon, and a pair of clutch members loosely-mounted in the interval on the shaft and cooperating to exert working force of different degree upon the abutments when one of said members is driven in opposite directions.

2. A differential release transmission comprising a transmission shaft with spaced abutments thereon, and a pair of clutch members embodying opposing teeth interlapping liberal circumferential clearances loosely-mounted in the interval on the shaft with interposition therebetween of means to maintain them in yielding contact with the abutments; said members cooperating, when one of them is driven in opposite directions, to exert working effort of different degree upon the abutments.

3. A differential release transmission comprising a transmission shaft with spaced abutments thereon, and a pair of loosely-mounted clutch members embodying opposing wedge teeth interlapping liberal circumferential clearances in the interval on the shaft with a compression spring interposed therebetween to maintain them in yielding contact with the abutments; said members cooperating, when one of them is driven in opposite directions, to exert working force of different degree upon the abutments.

4. A differential transmission comprising a transmission shaft with spaced abutments thereon, and a pair of loosely-mounted cooperating clutch members thereon, said clutch members having teeth with different opposing wedge slopes along opposite edges interlapping with liberal circumferential clearances whereby working effort is exerted of different degree upon the abutments when one of the members is driven in opposite directions.

5. A differential release transmission comprising a motor, a transmission shaft with spaced abutments thereon, and a pair of loosely-mounted clutch members in the interval on the shaft, said clutch members having opposing wedge teeth interlapping with liberal circumferential clearance to permit lost motion and thereby enable the motor to pick up speed incidental to reversals in driving one of the clutch members before taking the load of the transmission shaft.

6. A differential release transmission for actuating valves and the like comprising a motor, a transmission shaft operatively coordinated with the stem of the valve, said shaft carrying spaced abutments, and a pair of loosely-mounted clutch members in the interval on the shaft cooperating when one of them is driven in opposite directions by the motor, to exert frictional pressure to different extents upon the abutments with communication to the transmission shaft, of greater torque at the time of opening the valve than at the time of closing it.

7. A differential release transmission for actuating valves and the like comprising a motor, a transmission shaft operatively coordinated with the stem of the valve, said shaft carrying spaced abutments, a pair of loosely-mounted clutch members in the interval on the shaft cooperating when one of them is driven in opposite directions by the motor, to exert frictional pressure to different extents upon the abutments with communication to the transmission shaft, of greater torque at the time of opening the valve than at the time of closing it, and means controlled through movement of the valve stem to effect automatic stoppage of the motor.

8. A differential release transmission for actuating valves and the like comprising a motor, a transmission shaft operatively coordinated with the stem of the valve, said shaft carrying spaced abutments, a pair of loosely-mounted clutch members in the interval on the shaft cooperating when one of them is driven in opposite directions by the motor, to exert frictional pressure to different extents upon the abutments with communication to the transmission shaft, of greater torque at the time of opening the valve than at the time of closing it, and a limit switch including a disk driven through motion derived from the valve stem, and a pair of contact control members adapted to be alternately operated as the disk is rotated in opposite directions incidental to opening and closing of the valve thereby to effect automatic stoppage of the motor.

9. A differential release transmission for actuating valves and the like comprising a motor, a transmission shaft operatively coordinated with the stem of the valve, said shaft carrying spaced abutments, a pair of loosely-mounted clutch members in the interval on the shaft cooperating when one of them is driven in opposite directions by the motor, to exert frictional pressure to different extents upon the abutments with communication to the transmission shaft, of greater torque at the time of opening the valve than at the time of closing it, and a limit switch including a disk driven through motion derived from the valve stem, and a pair of contact control members with spring-separated actuating levers lying in the path of a pin on said disk and adapted to be engaged alternately as the disk is rotated in opposite directions incidental to valve opening and closing thereby to effect automatic stoppage of the motor.

In testimony whereof, I have hereunto signed my name at Norristown, Pennsylvania, this 13th day of July, 1927.

HARRY A. LEWIS.